US011442237B2

(12) United States Patent
Giraud et al.

(10) Patent No.: US 11,442,237 B2
(45) Date of Patent: Sep. 13, 2022

(54) SEALING BRACKET AND CABINET INCLUDING BRACKET

(71) Applicant: CORNING RESEARCH & DEVELOPMENT CORPORATION, Corning, NY (US)

(72) Inventors: William Julius McPhil Giraud, Azle, TX (US); Brian Duane Kingsbury, Watauga, TX (US); Robert Tomasz Klak, Zdunska Wola (PL)

(73) Assignee: Corning Research & Development Corporation, Corning, NY (US)

( * ) Notice: Subject to any disclaimer, the term of this patent is extended or adjusted under 35 U.S.C. 154(b) by 103 days.

(21) Appl. No.: 17/030,967

(22) Filed: Sep. 24, 2020

(65) Prior Publication Data

US 2021/0026090 A1    Jan. 28, 2021

Related U.S. Application Data

(63) Continuation of application No. PCT/US2019/024923, filed on Mar. 29, 2019.
(Continued)

(51) Int. Cl.
*G02B 6/44* (2006.01)
*H04Q 1/02* (2006.01)

(52) U.S. Cl.
CPC ........... *G02B 6/4452* (2013.01); *H04Q 1/025* (2013.01); *H04Q 1/114* (2013.01)

(58) Field of Classification Search
CPC ...... G02B 6/4452; G02B 6/444; H04Q 1/025; H04Q 1/114; H02B 1/38; H02B 1/012; H02B 1/28; H02B 1/301
See application file for complete search history.

(56) References Cited

U.S. PATENT DOCUMENTS 5,631,993 A * 5/1997 Cloud .................. G02B 6/4454
385/136
2005/0047097 A1    3/2005 Johnson et al.
(Continued)

FOREIGN PATENT DOCUMENTS

DE    102011012433 A1 * 8/2012 ............... B21D 5/16
EP       3706599 A1    9/2020
JP    2015-216817 A   12/2015

OTHER PUBLICATIONS

International Search Report and Written Opinion of the International Searching Authority; PCT/US2019/024923; dated Jul. 23, 2019; 14 Pages; European Patent Office.
(Continued)

*Primary Examiner* — Ellen E Kim
(74) *Attorney, Agent, or Firm* — Kapil U. Banakar (57) ABSTRACT

A bracket may include a structural portion including at least one relatively rigid first material, and a sealing portion including at least one relatively elastic second material. The bracket may also include a first receiver including a first retainer portion configured to be coupled to an end of a first frame member, and a first sealing interface configured to provide a substantially fluid-resistant seal between a portion of the end of the first frame member and the first receiver. The corner bracket may also include a second receiver substantially parallel to the first receiver and including a second retainer portion configured to be coupled to an end of a second frame member, and a second sealing interface configured to provide a substantially fluid-resistant seal between a portion of the end of the second frame member and the second receiver. The bracket may be incorporated into a cabinet frame.

27 Claims, 5 Drawing Sheets

Related U.S. Application Data (60) Provisional application No. 62/652,684, filed on Apr. 4, 2018.

(56) References Cited

U.S. PATENT DOCUMENTS

| | | |
|---|---|---|
| 2012/0068586 A1 | 3/2012 | Chen |
| 2013/0146321 A1* | 6/2013 | Takata .................. H02B 1/301 174/50 |
| 2014/0008192 A1 | 1/2014 | Christophy et al. |
| 2014/0050344 A1 | 2/2014 | Hilderman et al. |
| 2014/0367923 A1* | 12/2014 | Schaaf .................. H02B 1/301 277/637 |
| 2016/0073525 A1 | 3/2016 | Maloney et al. |

OTHER PUBLICATIONS

Jon Gelston: "Tips for Waterproofing an Electronic Enclosure", Nov. 30, 2016, XP055602052, Retrieved from the Internet: URL:http://www.aimprocessing.com/blog/tips-for-waterproofing-an-electronic-enclosure [retrieved on Jul. 3, 2019].

European Patent Application No. 19725788.4, Office Action dated Jul. 8, 2022; 6 pages; European Patent Office.

* cited by examiner

SEALING BRACKET AND CABINET INCLUDING BRACKET

PRIORITY APPLICATION

This application is a continuation of International Application No. PCT/US19/24923, filed on Mar. 29, 2019, which claims the benefit of priority to U.S. Application No. 62/652,684, filed on Apr. 4, 2018, both applications being incorporated herein by reference.

BACKGROUND

This disclosure relates to cabinets, and more particularly, to cabinets for housing equipment and including brackets for providing structural support and fluid resistance between the brackets and frame members of the cabinet.

Cabinets may be used to enclose and protect equipment, such as, for example, fiber optic equipment associated with fiber optic cables including optical fibers. For example, fiber optic equipment may be enclosed in cabinets and provide connections and circuitry for facilitating broadband voice, video, and data transmission. One example of a cabinet for enclosing fiber optic equipment is a fiber optic distribution outdoor cabinet, some of which may be intended to be installed in an outdoor environment exposed to the elements. In order to substantially prevent moisture and dust from the environment from entering the interior of the cabinet, some cabinets include a seamless single-piece shell. However, cabinets formed in such a manner may exhibit a number of possible drawbacks. For example, due at least in part to the single-piece shell construction, such cabinets are not scalable, and thus, cannot be easily assembled or modified in the field to increase (or reduce) the size of the cabinet to tailor the cabinet to meet the capacity requirements of the equipment being enclosed therein. Thus, it may be necessary to manufacture such cabinets in a large number of different sizes to meet the needs for different installations, which may result in manufacturing and inventory inefficiencies. In addition, larger cabinets needed to meet large capacity requirements may be cumbersome to transport and install due to their large size and weight. Further, it may be difficult to repair or replace damaged portions of the cabinet due, at least in part to having a single-piece construction and/or the possible need to disconnect any cables entering the cabinet when repairing the cabinet, which may result in additional complexity and expense.

Some examples described herein may address one or more of these possible drawbacks.

SUMMARY

The present disclosure is generally directed to a bracket for coupling two or more frame members to one another. The bracket may include a structural portion including at least one first material, and a sealing portion including at least one second material. The at least one first material may be relatively more rigid than the at least one second material, and the at least one second material may be relatively more elastic than the at least one first material. The bracket may also include a first receiver defining a first longitudinal axis and configured to receive an end of a first frame member. In some examples, the first receiver may include a first retainer portion configured to be coupled to the end of the first frame member, and a first sealing interface configured to provide a substantially fluid-resistant seal between a portion of the end of the first frame member and the first receiver. The bracket may also include a second receiver defining a second longitudinal axis substantially parallel to the first longitudinal axis of the first receiver and configured to receive an end of a second frame member. In some examples, the second receiver may include a second retainer portion configured to be coupled to the end of the second frame member, and a second sealing interface configured to provide a substantially fluid-resistant seal between a portion of the end of the second frame member and the second receiver. The structural portion may include the first retainer portion and the second retainer portion, and the sealing portion may include the first sealing interface and the second sealing interface.

This disclosure is also generally directed to a joint at which two or more frame members are coupled to one another. The joint may include a first frame member defining a first longitudinal frame member axis, and a second frame member defining a second longitudinal frame member axis. The joint may also include a bracket coupling the first frame member and the second frame member to one another. The bracket may include a structural portion including at least one first material, and a sealing portion including at least one second material different than the at least one first material. The bracket may include a first receiver defining a first longitudinal axis and receiving an end of the first frame member. In some examples, the first receiver may include a first retainer portion coupled to the end of the first frame member, and a first sealing interface configured to provide a substantially fluid-resistant seal between a portion of the end of the first frame member and the first receiver. The bracket may also include a second receiver defining a second longitudinal axis substantially parallel to the first longitudinal axis of the first receiver and configured to receive an end of the second frame member. The second receiver may include a second retainer portion coupled to the end of the second frame member, and a second sealing interface configured to provide a substantially fluid-resistant seal between a portion of the end of the second frame member and the second receiver. The first frame member longitudinal axis and the second frame member longitudinal axis may be substantially parallel with respect to one another.

This disclosure is also generally directed to a cabinet defining an interior and an exterior. The cabinet may include a frame and a plurality of panels coupled to the frame to define an interior and an exterior of the cabinet. The frame may include a plurality of frame members and a plurality of brackets coupling at least some of the plurality of frame members to one another. At least one of the plurality of brackets may include a structural portion including at least one first material, and a sealing portion including at least one second material different than the at least one first material. The at least one bracket may also include a first receiver defining a first longitudinal axis and receiving an end of a first one of the plurality of frame members. In some examples, the first receiver may include a first retainer portion coupled to the end of the first one of the plurality of frame members, and a first sealing interface configured to provide a substantially fluid-resistant seal between a portion of the end of the first one of the plurality of frame members and the first receiver. The at least one bracket may also include a second receiver defining a second longitudinal axis substantially parallel to the first longitudinal axis of the first receiver and configured to receive an end of a second one of the plurality of frame members. In some examples, the second receiver may include a second retainer portion coupled to the end of the second one of the plurality of frame members, and a second sealing interface configured to provide a substantially fluid-resistant seal between a portion of the end of the second one of the plurality of frame members and the second receiver. The first one of the plurality of frame members may define a first frame member longitudinal axis, the second one of the plurality of frame members may define a second frame member longitudinal axis, and the first frame member longitudinal axis and the second frame member longitudinal axis are substantially parallel with respect to one another.

DETAILED DESCRIPTION

Reference will now be made in detail to embodiments, examples of which are illustrated in the accompanying drawings. Whenever possible, the same reference numbers are used throughout the drawings to refer to the same or like parts.

This disclosure is generally directed to cabinets, such as, for example, cabinets for housing equipment and including brackets for providing structural support and fluid resistance between the brackets and frame members of the cabinet. According to some examples, the cabinets described herein may be assembled on site and may be scalable to meet the capacity requirements of the equipment being enclosed by the cabinet. For example, some examples of the cabinet may be formed by a frame assembled from frame members coupled to one another by brackets. The frame members may be provided (or modified on-site) to build a frame (e.g., off-site or on-site) defining the desired interior dimensions, and the brackets may be used to couple the frame members to one another. Thereafter, panels may be attached to the frame to create the cabinet. In some examples, one or more of the panels may be pivotally coupled to the frame to provide one or more doors configured to pivot between open and closed orientations.

In some examples, the equipment to be enclosed in the cabinet may be assembled and/or coupled to the interior of the cabinet during and/or after completion of assembly of the cabinet. In some examples, the brackets may provide both structural support for securely coupling two or more frame members to one another (e.g., rigidly coupling them to one another) and a substantially-fluid resistant seal (e.g., a fluid-tight seal) between the bracket and the two or more frame members and, in some examples, between the bracket and the panels of the cabinet. Some examples may also at least partially provide a cabinet that is scalable to tailor its exterior size and/or interior size to meet the capacity needs of a particular installation due to the cabinet being formed as a frame with panels secured thereto, as compared to a cabinet including a monolithic shell having a size that cannot be easily altered. For example, brackets such as at least some of the example brackets disclosed herein may be used with frame members having different lengths (or different combinations of frame members and brackets) to create cabinets having different dimensions to meet the capacity needs of a particular installation. In addition, some examples may provide an ability to repair and/or replace portions of a cabinet, for example, by removing one or more of the panels from the frame and repairing and/or replacing the portions of the cabinet desired to be replaced and/or repaired. In addition, if the future requirements of a particular installation change, such that, for example, a larger interior space is desired to meet greater interior capacity requirements, some examples may provide the ability to be modified to increase the size of cabinet, for example, by removing some of the exterior panels, increasing the size of the frame to the desired size using frame members and brackets, and installing panels onto the modified frame to create a cabinet having the desired interior capacity.

Figure 1:
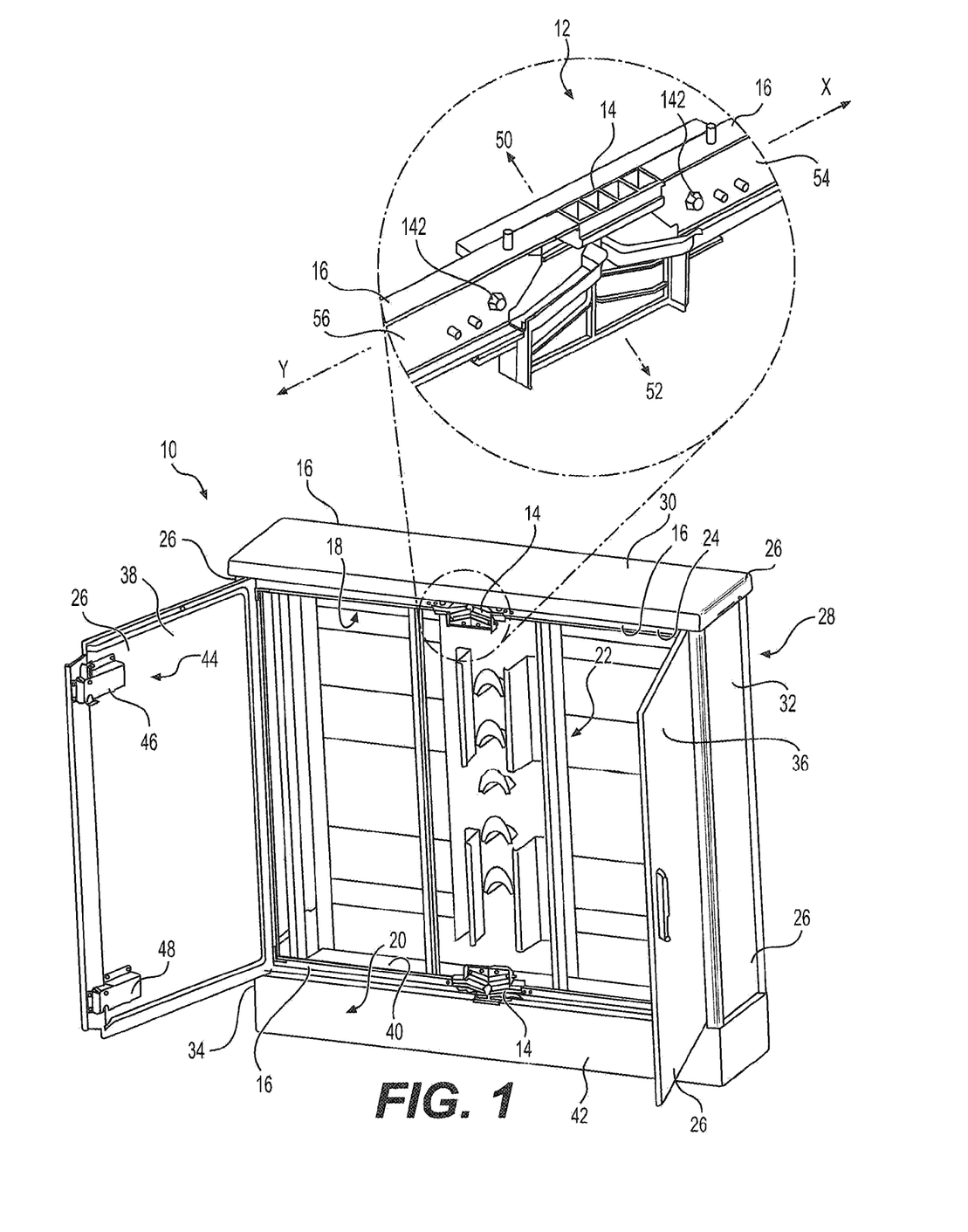
FIG. 1 is a schematic perspective view of an example cabinet including a detailed perspective view of an example joint including an example bracket coupling two example frame members to one another.

FIG. 1 is a schematic perspective view of an example cabinet 10 including a detailed perspective view of an example joint 12 including an example bracket 14 coupling two example frame members 16 to one another. The example cabinet 10 shown in FIG. 1 is a cabinet for enclosing fiber optic equipment, such as fiber optic cables including optical fibers, and connections and circuitry for facilitating broadband voice, video, and data transmission. In some examples, the cabinet 10 may be a fiber optic distribution outdoor cabinet, which may be intended to be installed in an outdoor environment exposed to the elements. Other types of cabinets for enclosing other types of equipment are contemplated.

As shown in FIG. 1, the example cabinet 10 defines an interior 18 and an exterior 20. In the example shown, the interior 18 includes various structures 22 known to those skilled in the art for facilitating routing and/or connection of fiber optic cables including optical fibers (not shown for clarity). The example cabinet 10 shown includes a frame 24 and a plurality of exterior panels 26 secured to the frame 24 for enclosing the interior 18 of the cabinet 10. For example, the cabinet 10 includes a back panel 28 coupled to a back side of the frame 24, a top panel 30 coupled to a top side of the frame 24, a first side panel 32 coupled to a first side of the frame 24, a second side panel 34 coupled to a second side of the frame 24 opposite the first side panel 32, a first door panel 36 coupled to a front side of the frame 24, such that it pivots with respect to the frame 24, and a second door panel 38 coupled to a front side of the frame 24, such that it pivots with respect to the frame 24. In some examples, the cabinet 10 also includes a bottom panel 40 coupled to a bottom side of the frame 24. In some examples, the bottom panel 40 may include apertures (not shown for clarity) facilitating entry of cables, such as, for example, fiber optic cables, into the interior 18 of the cabinet 10. The example shown also includes a skirt 42 coupled to and extending around the periphery of the bottom of the frame 24, which provides protection for cables entering the interior 18 of the cabinet 10 through the bottom panel 40.

As shown in FIG. 1, one or more of the first door panel 36 or the second door panel 38 may include a latch assembly 44 for securing the first and second door panels 36 and 38 in the closed orientation. In the example shown, the latch assembly 44 includes an upper latch mechanism 46 and a lower latch mechanism 48, each including a keeper (not shown) configured to selectively engage a respective upper member of the frame 24 and lower member of the frame 24. Although FIG. 1 shows the latch assembly 44 coupled to an interior side of the second door panel 38, in some examples, a second latch mechanism may be coupled to the interior side of the first door panel 36.

As shown in FIG. 1, the frame 24 includes frame members 16 coupled to one another via brackets, such as, for example, the example bracket 14 shown. The example bracket 14 defines an interior side 50 and an exterior side 52 and is configured to couple a first frame member 54 (e.g., a first cross member) having a first longitudinal axis X and a second frame member 56 (e.g., also a cross member) having a second longitudinal axis Y to one another, for example, such that the longitudinal axes X and Y are substantially parallel with respect to one another.

Figure 2:
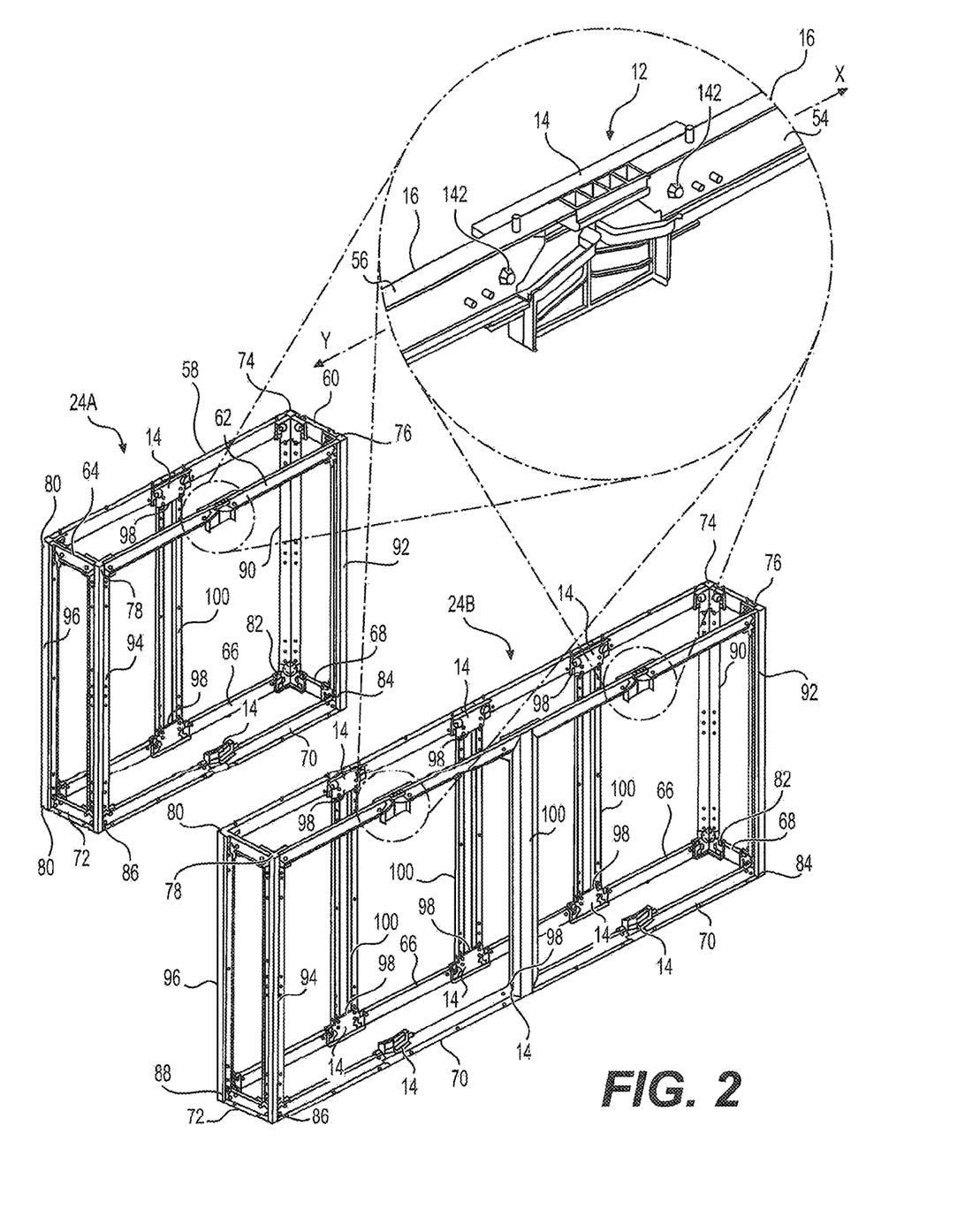
FIG. 2 is a schematic perspective view of two example frames for example cabinets including a detailed perspective partial section view of an example joint.

FIG. 2 is a schematic perspective view of two example frames 24A and 24B for respective cabinets including a detailed perspective partial section view of an example joint 12. As shown in FIG. 2, the example frame 24A may include an upper back frame member 58 including a first frame member 54 and a second frame member 56 coupled to one another by a bracket 14, an upper first side frame member 60, an upper front frame member 62 including a first frame member 54 and a second frame member 56 coupled to one another by a bracket 14, an upper second side frame member 64 opposite the upper first side frame member 60, a lower back frame member 66 including a first frame member 54 and a second frame member 56 coupled to one another by a bracket 14, a lower first side frame member 68, a lower front frame member 70 including a first frame member 54 and a second frame member 56 coupled to one another by a bracket 14, and a lower second side frame member 72 opposite the lower first side frame member 68. The example frame 24A also includes a first upper corner bracket 74 coupling the upper back frame member 58 and the upper first side frame member 60 to one another, a second upper corner bracket 76 coupling the upper first side frame member 60 and the upper front frame member 62 to one another, a third upper corner bracket 78 coupling the upper front frame member 62 and the upper second side frame member 64 to one another, and a fourth upper corner bracket 80 coupling the upper second side frame member 64 and the upper back frame member 58 to one another. The example frame 24A further includes a first lower corner bracket 82 coupling the lower back frame member 66 and the lower first side frame 68 member to one another, a second lower corner bracket 84 coupling the lower first side frame member 68 and the lower front frame member 70 to one another, a third lower corner bracket 86 coupling the lower front frame member 70 and the lower second side frame member 72 to one another, and a fourth lower corner bracket 88 coupling the lower second side frame member 72 and the lower back frame member 66 to one another.

In the example shown in FIG. 2, the frame 24A also includes a first corner frame member 90 (e.g., an upright) coupling the first upper corner bracket 74 and the first lower corner bracket 82 to one another, a second corner frame member 92 (e.g., an upright) coupling the second upper corner bracket 76 and the second lower corner bracket 84 to one another, a third corner frame member 94 (e.g., an upright) coupling the third upper corner bracket 78 and third lower corner bracket 86 to one another, and a fourth corner frame member 96 (e.g., an upright) coupling the fourth upper corner bracket 80 and the fourth lower corner bracket 88 to one another.

In some examples, the brackets 14 may serve to increase the length of the frame 24, provide coupling points 98 for additional frame members, such as frame member 100, and/or provide structural support and/or fluid-resistant sealing structures (e.g., fluid-tight sealing structures) for one or more of the first door panel 36 and the second door panel 38. Use of brackets such as the brackets 14 may facilitate expanding the length of the frame 24. In some examples, although not shown, brackets similar to the brackets 14 may be used to facilitate increasing the height and/or width of the frame 24 by incorporating such brackets into the corner frame members and/or side frame members, respectively. Such brackets may facilitate increasing the size of the cabinet, (e.g., on-site) without replacing the entire cabinet.

For example, as shown in FIG. 2, the example frame 24B has been lengthened relative to the example frame 24A described above. For example, the length of the frame 24B has been doubled relative to the length of the example frame 24A by using additional pairs of brackets at least similar to the example brackets 14 to effectively connect two of the example frames 24A to one another in an end-to-end fashion. In addition, the example frame 24B also includes additional frame members 100 (e.g., uprights) to provide additional support for the cabinet in which the frame 24B is incorporated. In this example manner, the brackets 14 and the frame members 16 may be used to create frames 24 of different dimensions, for example, in the length, height, and/or width dimensions.

In the example shown in FIG. 2, one or more of the brackets 14 (e.g., all of the brackets) may include a structural portion 102 including at least one first material, and a sealing portion 104 including at least one second material different than the at least one first material. In some examples, the at least one first material is relatively more rigid than the at least one second material, and the at least one second material is relatively more elastic than the at least one first material. For example, the at least one first material may be sufficiently rigid to rigidly secure the frame members 16 to one another, such that the frame 24 provides a structural support to which the panels 26 of the cabinet 10 (see FIG. 1) may be secured. In some examples, it may be desirable for the frame 24 to be sufficiently rigid to support the weight of the cabinet 10 and the equipment enclosed therein, and/or to prevent flexing of the frame 24 sufficient to compromise a substantially fluid-resistant seal (e.g., a fluid-tight seal) between the frame 24 and the panels 26 coupled to the frame 24. In some examples, the at least one first material may include one or more of steel, stainless steel, aluminum, titanium, platinum, fiber reinforced plastic, carbon fiber, or any other suitable strong and rigid material(s). In some examples, the at least one second material may be sufficiently elastic to provide a substantially fluid-resistant seal (e.g., a fluid-tight seal) between the brackets 14 and the frame members 16. In some examples, the at least one second material may include one or more of natural and/or synthetic rubbers and plastics. In some examples, the structural portion 102 is formed as a single unitary piece.

Figure 3:
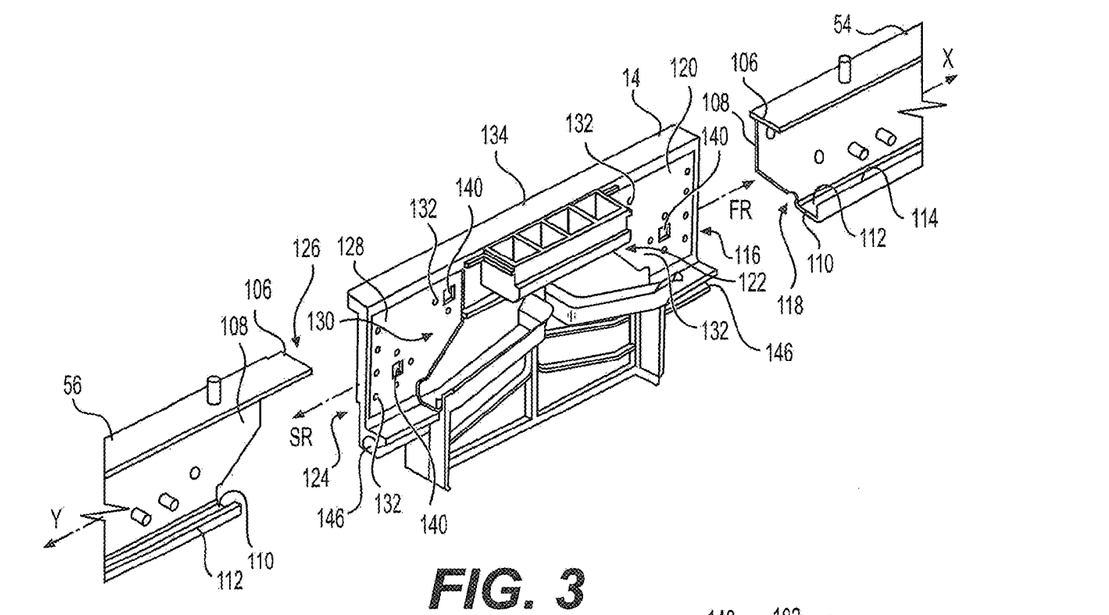
FIG. 3 is a schematic perspective exploded view of an example bracket configured to couple at least two example frame members to one another.

FIG. 3 is a schematic perspective exploded view of an example bracket 14 coupling two example frame members 16 to one another to form a joint 12. For example, the frame members 16 include a first frame member 54 and a second frame member 56 defining respective longitudinal axes X and Y that are substantially parallel with respect to one another when coupled to the example bracket 14. In the example shown, the first frame member 54 and the second frame member 56 have substantially the same cross-section (e.g., the same size and/or shape taken orthogonal with respect to the respective longitudinal axes X and Y). For example, each of the first and second frame members 54 and 56 includes an upper flange 106 (e.g., a substantially planar flange) configured to extend toward the exterior side 52 of the corner bracket 14 when coupled to the corner bracket 14. Each of the first and second frame members 54 and 56 also includes a web 108 (e.g., a substantially planar web) configured to extend transverse to (e.g., substantially orthogonal to) the upper flange 106, and a lower channel 110 configured to extend away from the exterior side 52 of the bracket 14 when coupled to the bracket 14, for example, in a direction substantially parallel to the upper flange 106. In the example shown, the lower channel 110 includes a trough 112 (e.g., a substantially planar trough) extending from the web 108 and terminating with a lip 114 that extends transverse to the trough 112 (e.g., substantially orthogonal to the trough 112). In the example shown, the web 108, the trough 112, and the lip 114 form a channel configured to provide a fluid passage between the web 108 and the lip 114.

Although the bracket 14, the first frame member 54, and the second frame 56 and related structures are sometimes described herein including terminology related to upper, lower, and lateral relationships, which may imply absolute relative orientations and/or relationships, these descriptions should not be interpreted in a manner to necessarily require absolute relationships, but rather, they should be interpreted in manner consistent with relative orientations and relationships.

Figure 4:
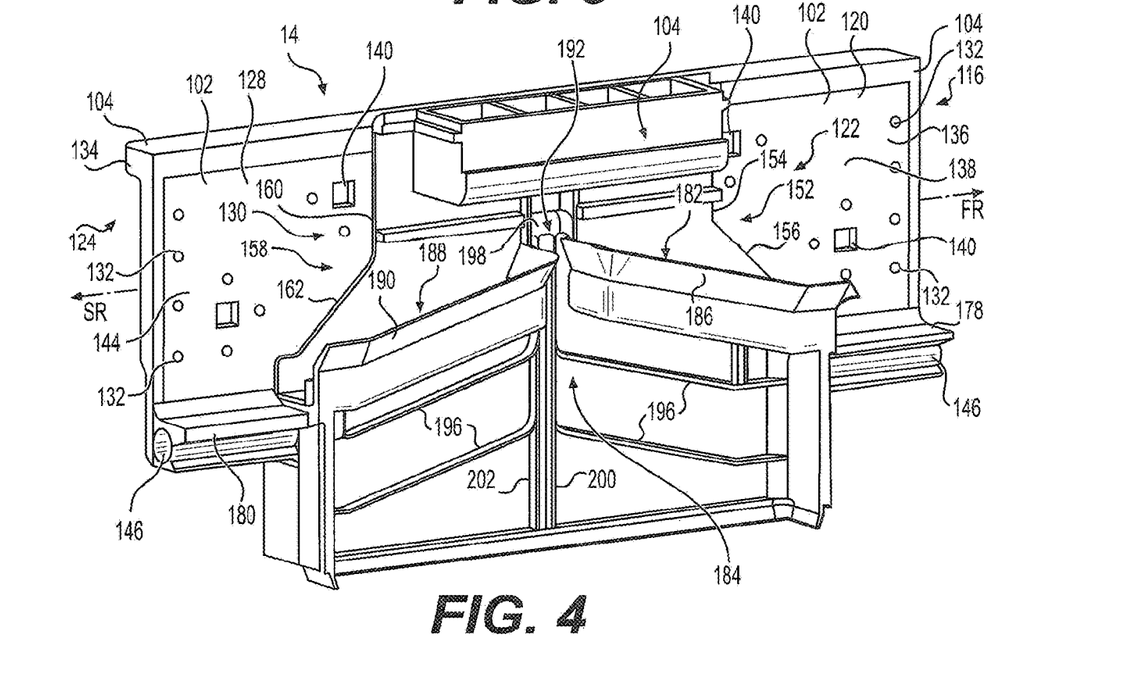
FIG. 4 is schematic perspective view of an example bracket shown from an exterior side.

As shown in FIG. 4, the example bracket 14 includes a first receiver 116 defining a first longitudinal axis FR and receiving an end 118 of the first frame member 54. In some examples, the first receiver 116 may include a first retainer portion 120 coupled to the end 118 of the first frame member 54, and a first sealing interface 122 configured to provide a substantially fluid-resistant seal (e.g., a fluid-tight seal) between a portion of the end 118 of the first frame member 54 and the first receiver 116. The example bracket 14 also includes a second receiver 124 defining a second longitudinal axis SR substantially parallel to the first longitudinal axis FR of the first receiver 116 and configured to receive an end 126 of the second frame member 56. In some examples, the second receiver 124 may include a second retainer portion 128 coupled to the end 126 of the second frame member 56, and a second sealing interface 130 configured to provide a substantially fluid-resistant seal (e.g., a fluid-tight seal) between a portion of the end 126 of the second frame member 56 and the second receiver 124.

As shown in FIG. 4, the structural portion 102 may include one or more of the first retainer portion 120 or the second retainer portion 128. In some examples, the sealing portion 104 may include one or more of the first sealing interface 122 or the second sealing interface 130. In some examples, the sealing portion 104 may at least partially encase the structural portion 102. For example, the sealing portion 104 may be over-molded onto the structural portion 102. In some examples, such as the example shown in FIG. 4, the structural portion 102 may include a plurality of apertures 132 (see also FIG. 3) in which a portion of the at least one second material may be received, providing engagement (e.g., additional engagement) between the structural portion 102 and the sealing portion 104.

In the example shown in FIG. 4, the bracket 14 also includes an inwardly extending flange 134 extending transverse with respect to the first receiver 116 and the second receiver 124. In some examples, the structural portion 102 and the sealing portion 104 may comprise the inwardly extending flange 134. In some examples, either the structural portion 102 or the sealing portion 104 may comprise the inwardly extending flange 134.

As shown in FIGS. 3 and 4, the first retainer portion 120 may include a first attachment portion 136 presenting an abutment surface 138 facing a direction transverse to the first longitudinal axis FR of the first receiver 116. In some examples, the first retainer portion 120 may include one or more holes 140 (see FIGS. 3, 4, and 8) extending through the first attachment portion 136 configured to receive fasteners 142 (e.g., screws and/or bolts (see FIGS. 1, 2, 5, and 6) configured to secure the end 118 of the first frame member 54 to the first retainer portion 120. In some examples, the second retainer portion 128 may include a second attachment portion 144 presenting a second abutment surfaces 146 facing a direction transverse to the second longitudinal axis SR of the second receiver 124. In some examples, the second retainer portion 128 may include one or more holes 140 extending through the second attachment portion 144 configured to receive fasteners 142 (e.g., screws and/or bolts) configured to secure the end 126 of the second frame member 56 to the second retainer portion 128. In some examples, one or more of the holes 140 may have a square-shaped cross-section configured to engage with a complimentary portion of a carriage bolt (not shown). In some examples, devices and/or methods other than fasteners may be used to couple the one or more of the first frame member 54 or the second frame member 56 to the bracket 14. In some examples, by attaching the frame members (e.g., directly) to the structural portion 102, the frame members may be rigidly coupled to one another, with the structural portion 102 substantially maintaining the relative angles and/or relative positions between the frame members.

As shown in FIG. 4, some brackets 14 may include one or more levels 146 coupled to the bracket 14. For example, the example bracket 14 shown in FIG. 4 includes two levels 146 (e.g., bubble levels) coupled to the first receiver 116 and the second receiver 124, such that the levels 146 may be used to level the bracket 14 (e.g., and the frame 24 attached thereto).

Figure 5:
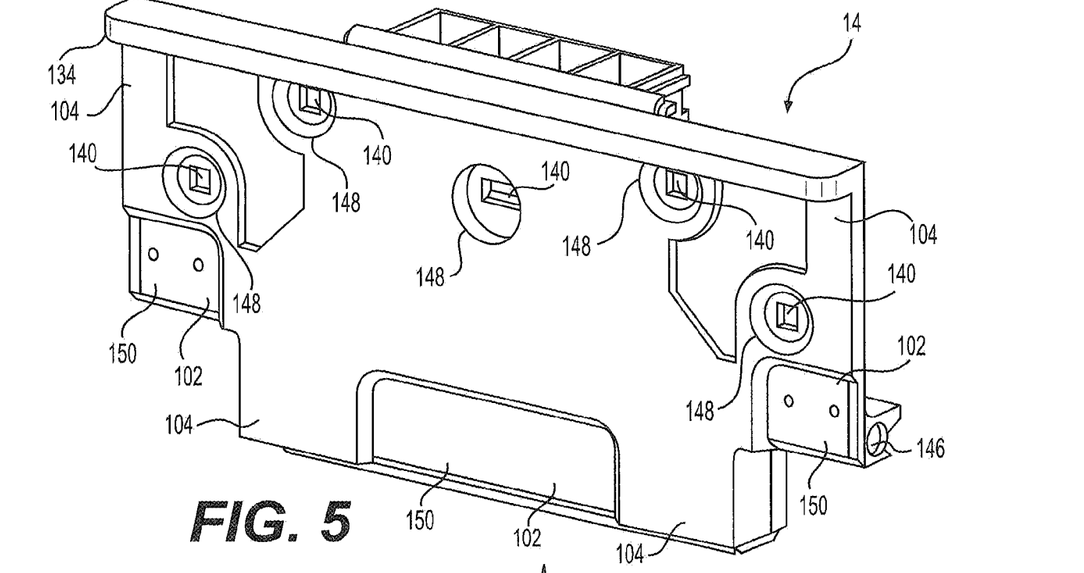
FIG. 5 is a schematic perspective view of the example bracket shown in FIG. 4 shown from an interior side.

As shown in FIGS. 4 and 5, the example bracket 14 defines an interior side 50 and an exterior side 52, and the holes 140 may be surrounded on the interior side 50 by portions 148 of the sealing portion 104. Some such examples may result in providing a substantially fluid-resistant seal (e.g., a substantially fluid-tight seal) between the interior side 50 and the exterior side 52 of the bracket 14, even though the holes 140 for receiving fasteners pass from the interior side 50 to the exterior side 52 of the bracket 14.

As shown in FIG. 5, some examples of the bracket 14 may be configured such that the sealing portion 104 defines exposed latching surfaces 150 of the structural portion 102 on the interior side 50 devoid of the at least one second material of the sealing portion 104. The latching surfaces 150 may provide a rigid surface against which a portion of a latch assembly 44 (e.g. a keeper) may abut (see, e.g., FIG. 8).

Figure 6:
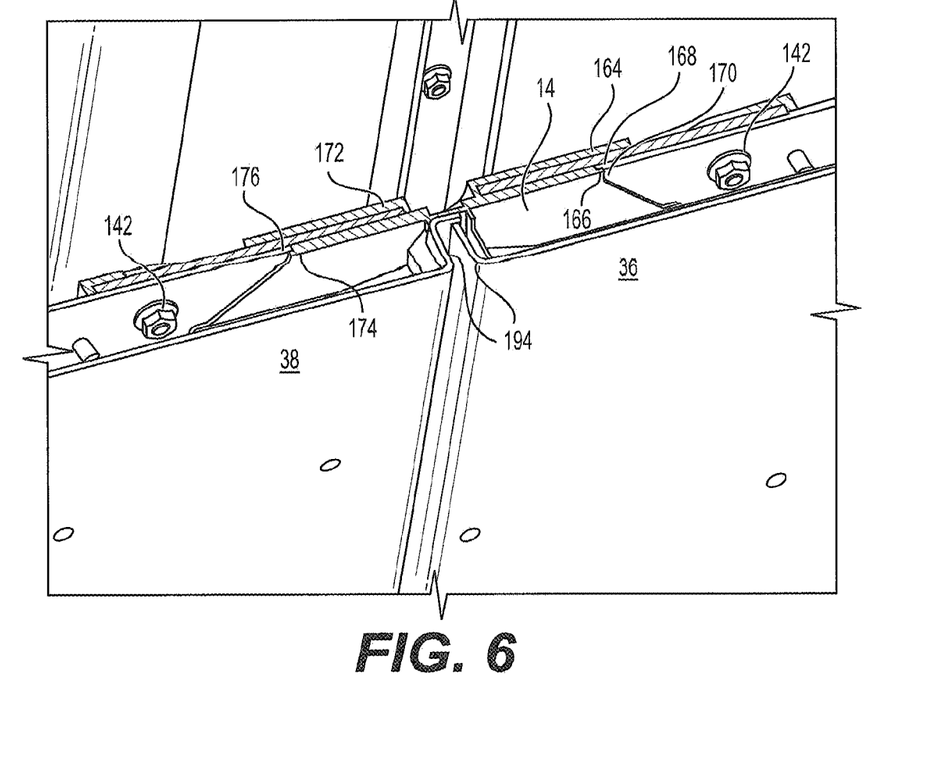
FIG. 6 is a schematic partial section perspective view of an example bracket coupling two example frame members to one another and in relation to two example door panels.
Figure 7:
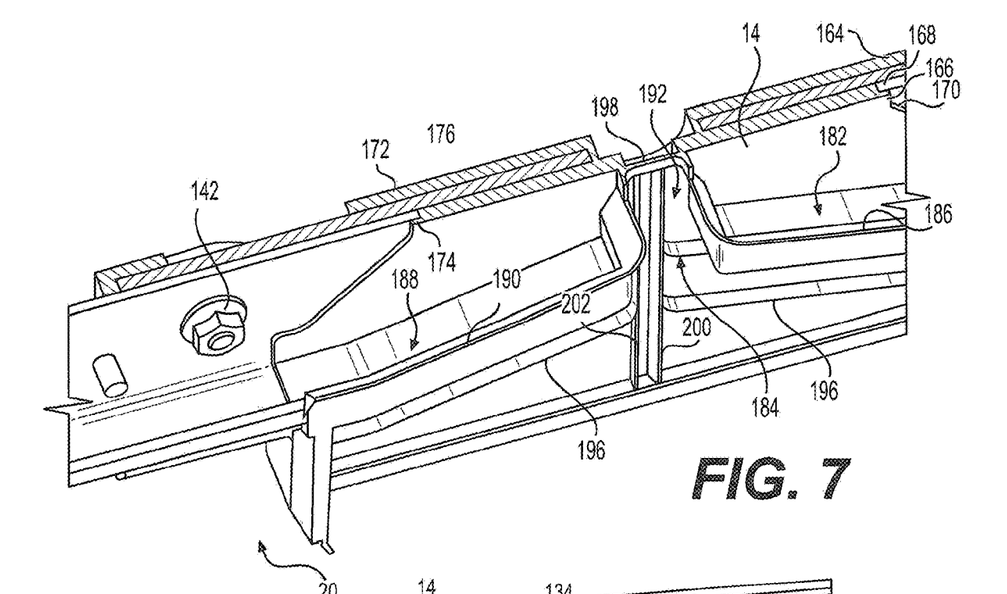
FIG. 7 is a schematic partial section perspective view of the example bracket and example frame members shown in FIG. 6.

Referring to FIGS. 4, 6, and 7, in some examples, the first sealing interface 122 may include a seal stop 152 including a first seal stop portion 154 extending in a first direction transverse (e.g., orthogonal) to the first longitudinal axis FR of the first receiver 116. In some examples, the first sealing interface 122 may also include a second seal stop portion 156 extending in a second direction oblique with respect to the first direction. The first seal stop portion 154 and the second seal stop portion 156 present respective seal surfaces for providing a substantially fluid-resistant seal (e.g., a fluid-tight seal) between the first seal stop portion 154 and a first portion of the end 118 of the first frame member 54, and between the second seal stop portion 156 and a second portion of the end 118 of the first frame member 54.

In some examples of the bracket 14, the second sealing interface 130 may include a second seal stop 158 including a third seal stop portion 160 extending in a third direction transverse (e.g., orthogonal) to the second longitudinal axis SR of the second receiver 124. In some examples, the second sealing interface 130 may also include a fourth seal stop portion 162 extending in a fourth direction oblique with respect to the third direction. The third seal stop portion 160 and the fourth seal stop portion 162 present respective seal surfaces for providing a substantially fluid-resistant seal (e.g., a fluid-tight seal) between the third seal stop portion 160 and a first portion of the end 126 of the second frame member 56, and between the fourth seal stop portion 162 and a second portion of the end 126 of the second frame member 56.

In some examples, for example, as shown in FIGS. 6 and 7, the first sealing interface 122 may include opposing fluid barriers 164 and 166 extending in a direction substantially parallel to the first longitudinal axis FR of the first receiver 116 and defining a pocket 168 configured to receive therein an edge portion 170 of the end 118 of the first frame member 54. In some examples, the pocket 168 and related structure may provide a relatively more reliable fluid-resistant seal between the bracket 14 and the first frame member 54. In some examples of the bracket 14, the second sealing interface 130 may include second opposing fluid barriers 172 and 174 extending in a direction substantially parallel to the second longitudinal axis SR of the second receiver 124 and forming a second pocket 176 at least similar to the opposing fluid barriers 164 and 166 and pocket 168 formed in the first sealing interface 122.

As shown in FIGS. 3, 4, and 7, the first sealing interface 122 may include a first seal flange 178 extending in a first direction substantially parallel to the first longitudinal axis FR of the first receiver 116. In some examples, the first seal flange 178 may be configured to be biased against a surface of the first frame member 54. For example, the first seal flange 178 may be configured to be biased against the trough 112 and/or the lip 114 of the first frame member 54, which may provide a relatively more reliable fluid-resistant seal between the bracket 14 and the first frame member 54. In some examples of the bracket 14, the second sealing interface 130 may include a second seal flange 180 at least similar to the first seal flange 178 formed in the first sealing interface 122.

As shown in FIGS. 3, 4, and 7, some examples of the bracket 14 may include a first sealing interface 122 that also includes a first channel 182 extending obliquely relative to the first longitudinal axis FR of the first receiver 116 from a central region 184 of the bracket 14 to the first seal flange 178. The first channel 182 may include a first outer edge 186 configured to press against an interior surface of a panel (e.g., an interior surface of a door panel). In some examples, the first outer edge 186 may have a tapered cross-sectional shape extending away from the first channel 182 toward the interior surface of the panel (e.g., similar to an edge of a windshield wiper) and configured improve the sealing ability of the first outer edge 186. In some examples, the second sealing interface 130 may also include a second channel 188 extending obliquely relative to the second longitudinal axis SR of the second receiver from the central region 184 of the bracket 14 to the second seal flange 180. In some examples, the second channel 188 may include a second outer edge 190 configured to press against an interior surface of a panel (e.g., a door panel). In some examples, the second outer edge 190 may have a tapered cross-sectional shape extending away from the second channel 188 toward the interior surface of the panel (e.g., similar to an edge of a windshield wiper) and configured improve the sealing ability of the second outer edge 190.

As shown in FIGS. 3, 4, and 7 the central region 184 of the bracket 14 may define a recess 192 configured to receive therein an edge of a panel (e.g., one or more edges 194 of one of more door panels 36 and/or 38) (see, e.g., FIG. 6). In some examples, for example as shown in FIG. 4, the central region 184 of the bracket 14 defines one or more raised ribs 196 extending obliquely with respect to the first longitudinal axis FR of the first receiver 116 and the second longitudinal axis SR of the second receiver 124, wherein the raised ribs 196 extend away from the structural portion 102 of the bracket 14 and are configured to divert fluid away from the recess 192. In the example shown in FIG. 4, the raised ribs 196 extend in a direction substantially parallel to the first channel 182 and the second channel 188.

In some examples, as shown in FIG. 4, the sealing portion 104 of the bracket 14 also includes a transverse seal 198 in an upper portion of the recess 192 and configured to abut against one or more edges 194 of one or more respective door panels 36 or 38. In the example shown, the transverse seal 198 extends in a direction substantially parallel to the first longitudinal axis FR of the first receiver 116 and the second longitudinal axis SR of the second receiver 124. The example bracket 14 shown in FIG. 4 also includes a pair of panel edge seals 200 and 202 extending substantially from the transverse seal 198 to the raised ribs 196, thereby substantially connecting the transverse seal 198 and the raised ribs 196 to one another, which may provide an additional seal against fluid entering the cabinet 10 in an area where the edges 194 of two door panels meet and nest in the recess 192 when the door panels 36 and 38 are in the closed orientation.

Figure 8:
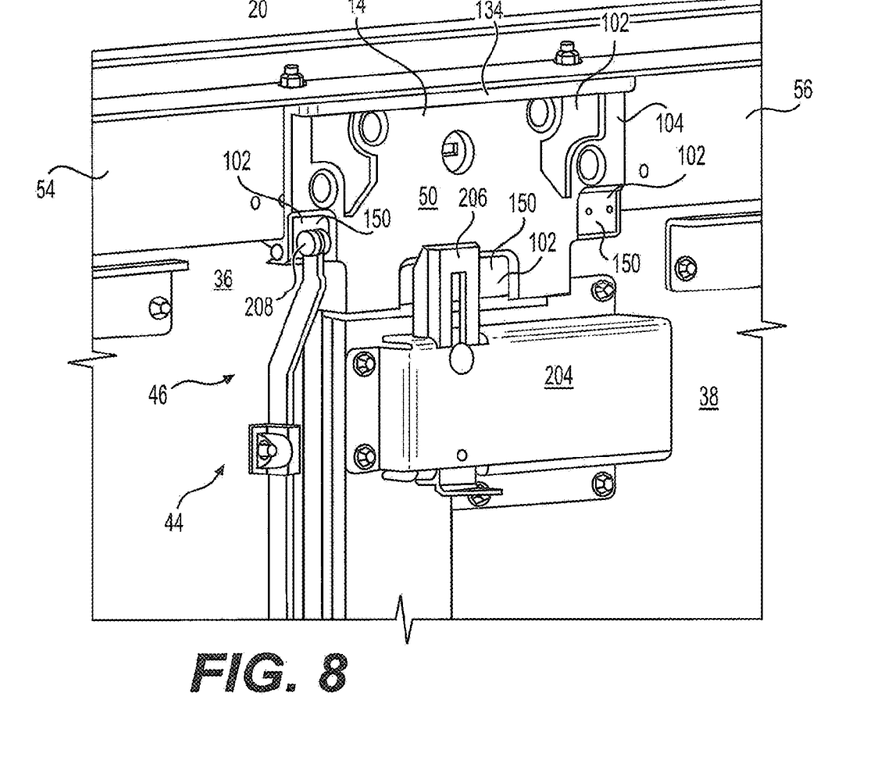
FIG. 8 is a schematic perspective view of an example bracket and an example latch assembly shown from the interior of the cabinet.

FIG. 8 is a schematic perspective view of an example bracket 14 and an example latch assembly 44 shown from the interior of the cabinet 10. As shown from the interior side 50 of the bracket 14, the example bracket 14 couples a first frame member 54 and a second frame member 56 to one another. The example latch assembly 44 includes an operator housing 204 coupled to an interior side of a door panel 36, and from which a latch bolt 206 may extend and abut an exposed latching surface 150 that is substantially free from the at least one second material of the sealing portion 104 of the bracket 14. The exposed latching portion 150 allows the latch bolt 206 to abut the relatively more rigid surface of the structural portion 102 of the bracket. As shown in FIG. 8, the example latch assembly 44 also includes an upper latch mechanism 46 including a catch 208, which may abut an exposed latching surface 150 that is substantially free from the at least one second material of the sealing portion 104.

Although this subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A bracket for coupling two or more frame members to one another, the bracket comprising:
a structural portion comprising at least one first material;
a sealing portion comprising at least one second material;
wherein the at least one first material is relatively more rigid than the at least one second material, and the at least one second material is relatively more elastic than the at least one first material and wherein the sealing portion at least partially encases the structural portion;
a first receiver defining a first longitudinal axis and configured to receive an end of a first frame member, the first receiver comprising:
a first retainer portion configured to be coupled to the end of the first frame member; and
a first sealing interface configured to provide a substantially fluid-resistant seal between a portion of the end of the first frame member and the first receiver;
a second receiver defining a second longitudinal axis substantially parallel to the first longitudinal axis of the first receiver and configured to receive an end of a second frame member, the second receiver comprising:
a second retainer portion configured to be coupled to the end of the second frame member; and
a second sealing interface configured to provide a substantially fluid resistant seal between a portion of the end of the second frame member and the second receiver,
wherein the structural portion comprises the first retainer portion and the second retainer portion, and
wherein the sealing portion comprises the first sealing interface and the second sealing interface.

2. The bracket of claim 1, wherein the sealing portion is over-molded onto the structural portion.

3. The bracket of claim 1, wherein the structural portion comprises a plurality of apertures in which a portion of the at least one second material is received, providing engagement between the structural portion and the sealing portion.

4. The bracket of claim 1, wherein the first retainer portion comprises:
a first attachment portion presenting an abutment surface facing a direction transverse to the first longitudinal axis of the first receiver; and
one or more holes extending through the first attachment portion configured to receive one or more fasteners configured to secure the end of the of the first frame member to the first retainer portion.

5. The bracket of claim 4, wherein the second retainer portion comprises:
a second attachment portion presenting a second abutment surface facing a direction transverse to the second longitudinal axis of the second receiver; and
one or more holes extending through the second attachment portion configured to receive one or more fasteners configured to secure the end of the second frame member to the second retainer portion.

6. The bracket of claim 1, wherein the first sealing interface comprises a seal stop comprising:
a first seal stop portion extending in a first direction transverse to the first longitudinal axis of the first receiver; and
a second seal stop portion extending in a second direction oblique with respect to the first direction,
wherein the first seal stop portion and the second seal stop portion present respective seal surfaces for providing a substantially fluid-resistant seal between the first seal stop portion and a first portion of the end of the first frame member and between the second seal stop portion and a second portion of the end of the first frame member.

7. The bracket of claim 6, wherein the second sealing interface comprises a second seal stop comprising:
a third seal stop portion extending in a third direction transverse to the second longitudinal axis of the second receiver; and
a fourth seal stop portion extending in a fourth direction oblique with respect to the third direction,
wherein the third seal stop portion and the fourth seal stop portion present respective seal surfaces for providing a substantially fluid-resistant seal between the third seal stop portion and a first portion of the end of the second frame member and between the fourth seal stop portion and a second portion of the end of the second frame member.

8. The bracket of claim 1, wherein the first sealing interface comprises opposing fluid barriers extending in a direction substantially parallel to the first longitudinal axis of the first receiver and defining a pocket configured to receive therein an edge portion of the end of the first frame member.

9. The bracket of claim 8, wherein the second sealing interface comprises second opposing fluid barriers extending in a direction substantially parallel to the second longitudinal axis of the second receiver and defining a second pocket configured to receive therein an edge portion of the end of the second frame member.

10. The bracket of claim 1, wherein the first sealing interface comprises a first seal flange extending in a first direction substantially parallel to the first longitudinal axis of the first receiver, the first seal flange configured to be biased against a surface of the first frame member.

11. The bracket of claim 10, wherein the first sealing interface further comprises a first seal extension extending from the first seal flange in the direction substantially parallel to the first direction and substantially transverse to the first seal flange, thereby defining a partial sleeve configured to receive therein a portion of the end of the first frame member.

12. The bracket of claim 11, wherein the second sealing interface comprises a second seal flange extending in a second direction substantially parallel to the second longitudinal axis of the second receiver, the second seal flange configured to be biased against a surface of the second frame member.

13. The bracket of claim 12, wherein the second sealing interface further comprises a second seal extension extending from the second seal flange in the direction substantially parallel to the second direction and substantially transverse to the second seal flange, thereby defining a second partial sleeve configured to receive therein a portion of the end of the second frame member.

14. The bracket of claim 10, wherein the first sealing interface further comprises a first channel extending obliquely relative to the first longitudinal axis of the first receiver from a central region of the bracket to the first seal flange, the first channel comprising an outer edge configured to press against an interior surface of a panel.

15. The bracket of claim 14, wherein the second sealing interface further comprises a second channel extending obliquely relative to the second longitudinal axis of the second receiver from the central region of the bracket to the second seal flange, the second channel comprising a second outer edge configured to press against an interior surface of a panel.

16. The bracket of claim 14, wherein the central region of the bracket defines a recess configured to receive therein an edge of a panel.

17. The bracket of claim 16, wherein central region of the bracket defines one or more raised ribs extending obliquely with respect to the first longitudinal axis of the first receiver and the second longitudinal axis of the second receiver, wherein the raised ribs extend away from the structural portion of the bracket and are configured to divert fluid away from the recess.

18. The bracket of claim 1, wherein the bracket defines an interior side and an exterior side, and the bracket further comprises an inwardly extending flange extending toward the interior side.

19. The bracket of claim 1, wherein the first retainer portion comprises:
   a first attachment portion presenting a first abutment surface facing a direction transverse to the first longitudinal axis of the first receiver; and
   one or more holes extending through the first attachment portion configured to receive one or more fasteners configured to secure the end of the first frame member to the first retainer portion,
   wherein the bracket defines an interior side and an exterior side, and
   wherein the one or more holes are surrounded on the interior side by portions of the sealing portion.

20. The bracket of claim 1, further comprising one or more levels coupled to one or more of the first receiver or the second receiver.

21. The bracket of claim 19, wherein the structural portion and the sealing portion comprise the inwardly extending flange.

22. The bracket of claim 19, wherein the second retainer portion comprises:
   a second attachment portion presenting a second abutment surface facing a direction transverse to the second longitudinal axis of the second receiver; and
   one or more second holes extending through the second attachment portion configured to receive one or more fasteners configured to secure the end of the second frame member to the second retainer portion,
   wherein the one or more second holes are surrounded on the interior side by portions of the sealing portion.

23. The bracket of claim 1, wherein the bracket defines an interior side and an exterior side, and wherein the sealing portion defines exposed latching surfaces on the interior side substantially devoid of the second material of the sealing portion.

24. A cabinet comprising:
   a frame, the frame comprising:
   a plurality of frame members; and
   a plurality of brackets coupling at least some of the plurality of frame members to one another, at least one of the plurality of brackets comprising:
   a structural portion comprising at least one first material;
   a sealing portion comprising at least one second material different than the at least one first material;
   a first receiver defining a first longitudinal axis and receiving an end of a first one of the plurality of frame members, the first receiver comprising:
   a first retainer portion coupled to the end of the first one of the plurality of frame members; and
   a first sealing interface configured to provide a substantially fluid-resistant seal between a portion of the end of the first one of the plurality of frame members and the first receiver;
   a second receiver defining a second longitudinal axis substantially parallel to the first longitudinal axis of the first receiver and configured to receive an end of a second one of the plurality of frame members, the second receiver comprising:
   a second retainer portion coupled to the end of the second one of the plurality of frame members; and
   a second sealing interface configured to provide a substantially fluid resistant seal between a portion of the end of the second one of the plurality of frame members and the second receiver,
   wherein the first one of the plurality of frame members defines a first frame member longitudinal axis and the second one of the plurality of frame members defines a second frame member longitudinal axis, and
   wherein the first frame member longitudinal axis and the second frame member longitudinal axis are substantially parallel with respect to one another.

25. The cabinet of claim 24, wherein the cabinet defines an interior and an exterior and the cabinet further comprises:
   a back panel coupled to a back side of the frame;
   a top panel coupled to a top side of the frame;
   a first side panel coupled to a first side of the frame; and
   at least one door panel coupled to a front side of the frame, such that the door is configured to pivot with respect to the frame between an open orientation and a closed orientation,
   wherein the frame, the back panel, the top panel, the first side, and the at least one door panel are configured to substantially prevent fluid from entering the interior of the cabinet when the at least one door panel is in the closed orientation.

26. The cabinet of claim 25, wherein the bracket defines and interior side, an exterior side, and a central region on the exterior side of the bracket, the central region defining a recess configured to receive therein an edge of at least one door panel when the at least one door panel is in the closed orientation.

27. The cabinet of claim 26, wherein central region of the bracket defines one or more raised ribs extending obliquely with respect to the first longitudinal axis of the first receiver and the second longitudinal axis of the second receiver, wherein the raised ribs extend away from the structural portion of the bracket and are configured to divert fluid away from the recess.

* * * * *

UNITED STATES PATENT AND TRADEMARK OFFICE
CERTIFICATE OF CORRECTION

| | |
|---|---|
| PATENT NO. | : 11,442,237 B2 |
| APPLICATION NO. | : 17/030967 |
| DATED | : September 13, 2022 |
| INVENTOR(S) | : William Julius McPhil Giraud et al. |

It is certified that error appears in the above-identified patent and that said Letters Patent is hereby corrected as shown below:

In the Claims

In Column 11, Line 46, in Claim 4, delete "of the of the" and insert -- of the --.

Signed and Sealed this
Fifteenth Day of November, 2022

Katherine Kelly Vidal
*Director of the United States Patent and Trademark Office*